United States Patent [19]

Hall et al.

[11] Patent Number: 4,550,527
[45] Date of Patent: Nov. 5, 1985

[54] METHOD AND MATERIAL FOR IMPROVING THE GROWTH OF PLANTS

[75] Inventors: Timothy J. Hall, Rustington; Eric J. Tridgell, London, both of England

[73] Assignee: National Research Development Corporation, England

[21] Appl. No.: 486,193

[22] Filed: Apr. 18, 1983

[30] Foreign Application Priority Data

Apr. 22, 1982 [GB] United Kingdom ............... 8211679
Jul. 27, 1982 [GB] United Kingdom ............... 8221637

[51] Int. Cl.$^4$ .............................................. C12N 1/14
[52] U.S. Cl. .......................................... 47/58; 47/74; 47/77
[58] Field of Search .................... 47/58, 57.6, 74, 77, 47/87, 48.5

[56] References Cited

U.S. PATENT DOCUMENTS

| | | | |
|---|---|---|---|
| 1,446,113 | 2/1923 | Blackwell | 47/74 |
| 1,988,307 | 1/1935 | Fay | 47/48.5 |
| 2,649,196 | 8/1953 | Arny et al. | 47/48.5 |
| 3,733,745 | 5/1973 | Ingerstedt et al. | 47/77 |

FOREIGN PATENT DOCUMENTS

| | | |
|---|---|---|
| 1408517 | 7/1965 | France . |
| 1553190 | 9/1979 | United Kingdom . |
| 2043688A | 10/1980 | United Kingdom . |

*Primary Examiner*—Robert E. Bagwill
*Attorney, Agent, or Firm*—Jacobs & Jacobs

[57] ABSTRACT

The invention is concerned with the problem of how best to infect roots of a plant with the beneficial mycorrhizal fungus. Merely mixing the inoculum of the fungus with soil or other growth medium is time-consuming and not very effective. The invention lies in the idea of positioning across the path of growth of the roots a carrier material, carrying the inoculum. The roots are then allowed to contact and penetrate the carrier material, so that they pick up the inoculum and become infected. The carrier material is integral and self-supporting. Preferably it is a sheet of cellulosic fibres coated with a layer containing the inoculum, which can also contain cellulosic fibres. Preferably peat-inoculum is used. The invention is useful in improving the growth of plants, particularly those grown in containers.

16 Claims, No Drawings

METHOD AND MATERIAL FOR IMPROVING THE GROWTH OF PLANTS

The present invention relates to a method and a material for improving the growth of plants by infecting plants with mycorrhizal fungi.

Many plants benefit from mycorrhizal fungi since they accumulate and transmit to the plant roots phosphorus, potassium and other essential nutrients accumulated by the fungus from the surrounding soil, and often also protect the plant from attack by diseasecausing organisms.

There are many environments where beneficial mycorrhizal fungi are not indigenous and even where they are present it is desirable to be able to ensure that each plant becomes infected to best advantage. The more dispersal of additional mycorrhizal fungi in the soil or other growth medium will not ensure that the roots necessarily become infected and, in any case, large quantities of the fungus, which will not necessarily remain viable, will be needed.

There has now been found, in accordance with the present invention, a method which ensures infection of the root system while requiring only small amounts of the fungus. Accordingly, the present invention provides a method of producing a mycorrhizal condition in a root system of plant, which method comprises growing the plant and positioning across the path of growth of at least part of the root system, a root-penetrable, integral carrier material carrying inoculum of a mycorrhizal fungus, so that at least part of the root system of the plant grows into contact with the carrier material and thereby becomes infected. The invention also includes the carrier material, which is preferably a web-like material, carrying inoculum of the fungus.

The potential advantages of producing a mycorrhizal condition in the plant roots include the following:
(1) improvement in the establishment of young seedlings,
(2) more healthy plants leading to faster growth,
(3) shorter overall growth period,
(4) a saving in fertilisers.

There is also the prospect of producing genetically engineered fungi capable of fixing nitrogen in association with a plant host.

The carrier material of the present invention is distinguished from, say, infected peat or rockwool, in being a coherent expanse of infected material and the preferred carrier material is further distinguished in having a web-like form. By dispersing infected peat or rockwool in soil there is absolutely no certainty that contact with the root system of a plant will occur. In the present invention, the use of the carrier material gives a very high chance of producing infection as the roots pass through or alongside it. This chance is increased by growing the plant in conditions where root growth is restricted within a confined region, e.g. by a container. While a considerable amount of infection is picked up by the mere contact of the roots with the carrier material, it is envisaged that under all practical circumstances it would be desirable to arrange that the roots penetrate the carrier material. With this in mind, best results are likely to be obtained from penetration or piercing of the carrier by the roots as they grow, although some measure of infection would be imparted by mere contact between roots and carrier.

Our British Patent Specification No. 2043688A relates to a method of culture of mycorrhizal fungi in which it necessary to infect plants initially with the fungus. One way suggested for doing this "involves the use of small, for example 0.5 cm$^2$, sachets of capillary matting containing inoculum amoung the plant roots". The term "integral, self-supporting carrier material" used in connection with the present invention does not cover a plurality of discrete inoculum dosage units because they are not integral and does not cover a sachet (because it is not a carrier to which the inoculum adheres).

British Patent Specification No. 1553190 describes the use of fragments of a gel of cross-linked polymer or mineral gel, in which a beneficial microorganism such as Rhizobium is embedded, to inoculate the rhizosphere of plants. Preferably small cubes of about one eighth cm$^3$ are used. These also do not fall within the term "integral, self-supporting carrier material" used in connection with the present invention.

The carrier material of the invention preferably comprises a web-like structure (hereinafter "web" for brevity) having thereon a layer (a pre-formed layer or coating) comprising the inoculum. This layer preferably contains an adhesive for bonding it to the web or binder for cohering particles etc. of finely divided inoculum or both. Alternatively, the web itself can contain the inoculum. Thus the web can be formed from a composition comprising carrier component and inoculum, or a pre-formed porous web can be impregnated with inoculum.

Referring to the first embodiment of the carrier material, the carrier component preferably has a web-like structure. It can take any elongate form in which one dimension is substantially less than either of the others, and is conveniently a self-supporting sheet. It must be capable of being penetrated by the roots as they grow. It is preferably porous, but non-porous webs capable of being pierced by roots would suffice. It need not be a continuous sheet, but can contain a grid of holes or other discontinuities, provided that it is integral or monolithic to an extent sufficient to achieve the objectives of the invention. It is implicit that the material of which it is made must not damage the plant roots substantially or be harmful to the inoculum. Preferably it is biodegradable, e.g. a biodegradable synthetic plastics material or comprises a natural polymeric material such as cellulose. Preferably it has a fibrous structure. Cellulose fibres, especially wood pulp, cotton or paper fibres, are preferred because they are of short length and are biodegradable. Thus the web is preferably a wood pulp or paper sheet.

While cellulosic fibers are particularly preferred as strengthimparting fibres for use in the carrier material of the present invention, any other fibres consistent with the objective of making a reasonably strong self-supporting sheet could be used in place of some or all of the cellulose fibres. Any man-made, natural or synthetic polymer fibres would ordinarily be suitable, subject to requirements of the particular process by which the carrier material is to be made. Textile materials, foamed plastics and needle-punched plastics are alternatives.

The inoculum must be caused to adhere to the web. One way of doing this is to apply a layer of adhesive, for example magnesium silicate gel, to the web. Inoculum can then merely be rollercoated or sprayed on to the adhesive layer. Alternatively one can apply a mixture of inoculum and adhesive to the web. Another method is to form a film or sheet, not necessarily self-supporting, of particles of inoculum and a binder. This sheet is then caused to adhere to the web. Preferably the binder is chosen to assist in the adhesion. For example, a binder of disintegrated paper or wood pulp is conveniently formulated with the inoculum into an aqueous composition and a layer of this composition is deposited on a cellulosic fibre web and dried. This binder will normally provide adequate adhesion for the inoculum on the web, especially a paper or wood pulp web. It might be preferable however, to use an additional adhesive or adhesive binder, for example magnesium silicate gel. The binder-containing coating composition can contain any desired concentration of inoculum, e.g. from 5 to 90% by dry weight, but if too much is included the desired binding and adhesive properties of the coating will suffer. Typically, 50 to 70% by dry weight will frequently be satisfactory.

The coating comprising the inoculum could be sandwiched between two webs. Two or more webs impart added strength to the carrier material. Any laminate structure containing the inoculum within at least one layer thereof is within the present invention.

Peat can be incorporated in the carrier material. One commercially available peat-containing sheet is 'Hortopaper', which is manufactured by Orebro Pappersbruk AB, Orebro, Sweden and available in the UK from Donaldson Paper & Board Sales Ltd, Suite 9, Essex House, 15, Station Road, Upminster, Essex RM14 2SJ. 'Hortopaper' is described as a blend of about 40% Sphagnum moss peat with 60% cellulose fibres, weighing about 280 grams per square meter. It is currently available in reels 1200 mm wide and in 50 and 100 meter lengths.

In the second embodiment of the carrier material, part or all of the inoculum is contained within the web. Conveniently it is formed by dispersing the fungal inoculum in a fibrous aqueous suspension or pulp, forming a web from this suspension or pulp, and drying it. A problem here is to incorporate a high proportion of inoculum in the web, yet also incorporate enough of the carrier component fibres to impart cohesion and strength to the resulting sheet so that it is self-supporting. When, as is preferred, the carrier component is of cellulose fibres, e.g. of paper, cotton or wood pulp, about 5-40% dry weight of inoculum is usually appropriate. Alternatively a web can be impregnated with the inoculum which can be applied by passing the web through a suspension of inoculum or by spraying a suspension of inoculum onto the web so that interstices thereof are penetrated by the inoculum. The comments made above in relation to the first (coated web) embodiment apply to the structure of the web and the carrier component thereof in this second embodiment.

The carrier material can also contain peat and preferably comprises a blend of cellulosic fibres with peat and mycorrhizal inoculum. The peat and inoculum can be incorporated as such, i.e. a pre-combined form conveniently referred to as "peat-inoculum", which can be made as described hereinafter.

If desired, inoculum can be present both within the web and as at least one layer thereon, but preferably most of it is present in a layer or layers.

The invention includes a composition suitable for use in preparing the carrier material, either for forming a web or for forming a layer on a pre-formed web. The composition is an aqueous suspension containing cellulosic fibres, inoculum, and preferably peat. It can contain other ingredients as desired, for example a binder, e.g. starch, and/or adhesive e.g. magnesium silicate gel. Besides cellulosic fibres, other fibres can be present including fibres of a synthetic or man-made polymer.

The term "web" or "web-like" does not imply that the carrier material is necessarily formed as a flat sheet. It can be given any desired configuration, e.g. by rolling, cutting, moulding, heat-forming, pressing or spinning, as appropriate to the kind of material of which it is made and the use to which it is to be put. For use in growing container plants the web will frequently be formed into approximately a pot-shape. The invention includes in particular cylindrical or pot-like carrier materials containing peat, in addition to inoculum and strength-imparting web fibres.

Drying can usually be carried out in air at about 25°-30° C. without adversely affecting the inoculum and higher temperatures might be usable. However, drying is preferably carried out at as low a temperature as possible to minimise the possibility of some loss of viability of the propagules. The use of "festoon driers" in paper-making factories is envisaged.

The inoculum of the mycorrhizal fungus can take any form known to contain active propagating elements (propagules). In the case of endo-mycorrhizal fungi, which do not ordinarily survive in the absence of a host, the inoculum will usually take the form of finely divided root infected with the fungus. Supplies of infected root can be produced in bulk by passaging inoculum in suitable host plants, e.g. lettuce or maize, preferably grown in peat, and harvesting the roots hereof. A proportion of the harvested roots is set aside as inoculum for infecting seedlings of further plants and so on. For growing the plants the nutrient thin film technique (NFT) described in our British Patent Specification No. 2043688 is recommended. The roots can be harvested in bare form. Preferably roots having a high level of sporocarps and/or resting spores of the endo-mycorrhizal fungi are selected for the inoculum, since preliminary evidence suggests that this form of inoculum retains infectivity for longer periods. Alternatively, the fungus is conveniently harvested by milling the entire block, i.e. the mixture of peat and roots, thereby providing "peat-inoculum".

Another method of preparing a pet-inoculum makes use of maize roots as the host. Conveniently, the culture takes place in pots on a bed of sand which is watered. One medium used was sphagnum moss peat containing per liter 0.5 g. "Ficote" 16-8-7 N-P-K fertiliser, 7 g. lime, 0.37 g. fritted trace elements and 1-2 g of bone meal. The starting inoculum was of *Glomus mosseae* YV strain.

A third method of preparing peat-inoculum makes use of the *Phaseolus* species, e.g. French beans, to provide the host. One medium used was based on sphagnum moss peat, another on sedge peat, each containing small amounts, e.g. 0.5-10 g/liter, of "Ficote", lime and trace elements as above and 1-2 g/liter of bone meal. The peat-inoculum obtained gave a greater yield of mycorrhizally infected roots than that obtained from maize plants or from lettuce plants with the NFT technique, using the same strain of mycorrhizal fungus. Inocula produced in soil or various other silicate materials are also useful in the invention.

Typical examples of methods by which the contact between the infected carrier material and roots of a container-grown plant may be ensured are as follows:
(a) At a suitable stage after germination, when the seedling is just producing susceptible rootlets, a disc of the mycorrhizally infected carrier material is inserted between the roots and the additional growth medium, e.g. vermiculite/peat mixture and soluble NPK but no sugars. Infection is more likely to occur, as the roots grow through the disc, under conditions of adequate light intensity and when phosphorus (P) is limiting. This can be achieved by decreasing the proportion of P in the soluble NPK feed or preferably by using compounds which release soluble P slowly into the growing medium, e.g. rock phosphate or resin-coated controlled release fertilisers.

(b) In this method the growth of the root system in the container takes place in two phases, a first phase where the growth is confined by means restricting room for growth, and a second phase, in which the room-restricting means is replaced by the infected carrier material and the roots are allowed to grow through the carrier material. For example, the carrier material in the form of a sheet is cut to the size required to extend across a seedling tray. The sheet can, if desired, be perforated. The tray is divided into compartments in which the seedlings grow and each compartment is also divided into upper and lower compartments by a plastics or other impervious sheet placed at a certain depth across the tray. During the initial period of growth, the roots are confined to the upper compartmennt by the impervious layer. After a period of time, say one to three months, the impervious layer is replaced by the infected paper sheet, the plant illuminated strongly and the phosphate content of the growth medium omitted. Rapid and widespread infection of the roots, growing through into the lower part of the container, can be assured.

(c) The infected carrier material can be rolled to form a cylinder or formed into the shape of a pot. Either the host plant may be grown initially in this cylinder or pot or it can be grown in a conventional pot and then repotted into the cylinder or pot made of the carrier material. The roots of the plant will then grow out sideways through the cylindrical or pot-shaped carrier. This is encouraged by placing rock phosphate in the soil outside the cylinder or pot.

It is also possible to apply the method of the invention to seedlings grown in the open soil. Long strips of the carrier material can be placed in furrows which are then covered with soil and sown with seeds. This aspect of the invention is of interest for improving crop yields on poor soil, e.g. reclaimed gravel pits, coal mine spoil tips or slag heaps.

The host plant should preferably be exposed to infection at an early stage of growth preferably before it has established any natural mycorrhizal association. In the case of conifers (e.g. pines, spruce and Douglas firs) this is preferably about the time when the first tertiary roots appear. The effectiveness of the association will depend also on many factors other than the nature of the plant and its fungal partner, particularly pH of soil, temperature and humidity.

It is clearly important to be selective in the matter of which mycorrhizal fungus to use in promoting the mycorrhizal condition in any particular plant species. The value of the individual partnerships will vary widely depending on the suitability of the fungal associate. Both endo- and ecto-mycorrhizal fungi are useful in forestry, ecto-mycorrhizal fungi being particularly suitable for nursery infection of pine, spruce and fir cedar, hemlock and eucalyptus. Endo-mycorrhizal fungi are considered suitable for similar application to most hardwoods and most tropical species. Ornamental trees and shrubs, both outdoors and indoors, are suitably treated with endo-mycorrhizal fungi, as are citrus tree and orchard tree (e.g. walnut or almond tree) root stock. Endo-mycorrhizal fungi are also considered of value in agriculture, particularly in the case of crops which require a transplantation stage, e.g. coffee and tobacco, which are in an equivalent position to the growth of tree seedlings which are outplanted, or where soil sterilisation is routinely practised as in the case of soft fruits or vegetables.

The most useful ecto-mycorrhizal fungi are for example *Pisolithus tintorius, Rhizopogon vulgaris* (particularly for sugar pine), *Laccaria lacata* (particularly for ponderosa pine), *Cenococcum graniforme* and Suillus granulatus. Examples of useful endo-mycorrhizal fungi are the vesicular-arbuscular (VA) *Glomus mosseae, Glomus macrocarpus, Gigaspora margarita* and *Gigaspora gigantea.* In some cases it will be advantageous to infect the plant with more than one kind of mycorrhizal fungus and this may be achieved either by using a single carrier material infected with two or more fungi or, more preferably, operating with separate carrier materials for each fungus. For example, by growing them through two sheets of paper carrying different mycorrhizal fungi the roots would become infected with both.

The carrier material can act as a carrier for other plant growth-stimulating agents, e.g. hormones or agents which will prevent indigenous pathogens from becoming established in the plant before the mycorrhiza become well established. These may be anti-bacterial or anti-fungal agents. It can also carry beneficial organisms, e.g. rhizobia.

The present invention is especially important in that it imparts a mycorrhizal condition to plants grown, at least initially, in containers whereby rapid infection is ensured and can be achieved with relatively low quantities of mycorrhizal fungus, thus providing a valuable method for use on a commercial scale.

The following examples illustrate the invention.

EXAMPLES

Methods are described in which chopped roots infected by VA mycorrizal fungi are incorporated within or attached to the surface of paper sheet. This can then be cut to fit plant containers of various sizes or applied as long strips in field situations.

1. Types of paper used

Three types of paper supplied by Whatman Paper Division have been used:
(a) 100% cotton linter—Whatman Grade No. 1,
(b) 100% wood pulp—Whatman Grade No. 6,
(c) Creped wood pulp containing urea-formaldehyde (wet strength resin)—Whatman Grade No. 91 or 7KG.

2. Inoculum used

The endophytes used were *Glomus mosseae,* YV strain and 'E3' thought to be *Glomus fasciculatus* (supplied initially by Rothamsted Experimental Station, Harpenden, Herts AL5 2JQ, England)

Infected bare maize root was produced by the nutrient thin film technique (NFT) described in British Patent Specification No. 2043688. The maize plants were raised in 5 cm lattice pots containing peat with lime and trace elements. After three weeks propagation the plants were positioned at 20 cm intervals along a channel 30 cm wide. Nutrient solution containing bone meal 30 g/100 liters and 50 mg N per plant per week was supplied. Plants were harvested 73 days after planting out. They had 65–85% of their root length infected and the root mat filled the 30 cm wide channel to a depth of 5–7 mm. The majority of root length (72% on average) was composed of roots with a diameter between 0.2 and 0.4 mm.

After harvest, root mats were stored in a cold store (0°–2° C.) in moist condition from two to twenty-five weeks before use. Several methods of chopping roots were employed but the most successful involved using sections of root mat usually approximately 30 cm$^2$ and pieces weighing 0.2–0.5 g were added to 150 ml of tap water in an "Atomix" homogenizer operated at full speed for 1 min. The suspension was then passed through a sieve to remove thick or tough roots which had not been adequately chopped. In some cases thick 'primary' roots were removed before chopping to improve the efficiency of the process. A "Silverson" blender, operated for up to 1 min, was also used when small root pieces were required. After chopping, the majority of intact root cylinders, from a typical sample of root mat, were estimated to be 0.5 to 2 mm in length. Often about 30% of chopped root fragments were no longer recognizable as complete cylinders.

Successful formulation experiments have also been conducted using larger portions of root, ranging from 1–4 mm.

Mycorrhizally infected root from plants grown in peat has also been used as a source of inoculum. A mixture of peat with mycorrhizal maize roots was produced by NFT. The plants were grown in "Jiffy" pots, and the inoculum was prepared by cutting the pot walls away from the root mat, breaking them open and removing all coarse primary root and stem. The remaining peat and heavily infected root pieces (92–98% of root length infected) were chopped in an "Atomix" blender for 1 min. A 1:1 by volume mixture of moist peat/root to tap water was generally used. Root fragments of between 1 and 3 mm predominated after this treatment.

The principal propagule in both the bare root and peat admixture types of inoculum was considered to be a small cylinder of root containing fungal hyphae and possibly vesicles, (thought, primarily, to be storage organs). Although extra-matrical mycelium was present, this was less likely to survive severe drying and storage than hyphae within roots. The function of secondary spores which often occur on extra-matrical hyphae is not fully understood, but they are unlikely to be infective. Material with few sporocarps ('YV' strain) structures containing several resting spores, was deliberately selected for much of this work in an attempt to assess the potential of chopped root pieces as infective propagules.

Another inoculum used was a mixture of peat with mycorrhizally infected lettuce roots obtained by NFT, stored for several weeks in moist condition, and then milled to a dry powder (800 micron size). This material was supplied by Rothamsted Experimental Station, Harpenden.

3. Production of paper sheets mycorrhizal propagules

Method 1

Various proportions ranging from 5 to 40% (by dry weight) of fresh chopped maize roots infected with Glomus mosseae YV strain were mixed with a suspension of cotton linter fibres obtained by homogenizing Whatman No. 1 paper. The suspended mixture was brought down on to a filter paper disc in a Buchner funnel apparatus. The resulting reconstituted paper layer was peeled from its backing sheet and allowed to dry.

This method is considered possibly disadvantageous for scaling up. It was felt that the physical presence of "contraries" i.e. foreign matter, could reduce the tensile strength of the paper. There was also a possibility of introducing cellulose-degrading organisms as contaminants into the paper-making machinery.

Method 2a

Infected root pieces were coated on the surface of pre-formed paper sheets. Method 1 was modified as follows. The proportion of chopped root in the mixture was increased to between 50 and 70% (by dry weight). A thin film of paper fibres and chopped root was then brought down on to discs of Whatman No. 1 or No. 91 (creped) paper. The layer thus deposited adhered well to the disc. Providing that the discs were not roughly handled, the deposited layer remained attached to the backing sheet after drying. The irregular surface of the creped paper assisted in the formation of a stronger bond between the two layers.

Method 2b

Another procedure recently adopted for attaching chopped root or chopped root+peat to paper involved using "Laponite 550" (Laporte Industries plc) a magnesium silicate gel. Finely chopped root suspension (with or without peat) was mixed with "Laponite 550" powder (2.0 to 2.3 g/100 ml) in a Silverson blender until the gel had formed. Inoculum was then sprayed on to paper by passing a jet of compressed air over the top of the vertical 3.5 mm diameter tube held in the gel.

This process could readily be adapted for industrial use, perhaps by the inclusion of a peristaltic pump to assist in the accurate delivery of gel to the compressed air spray. Alternatively the gel could be applied to paper by means of "lick-up" rollers—a technique commonly used for applying coatings to paper.

One advantage of the use of a gel is that the inoculum remains evenly distributed in the medium for a long period and that relatively small amounts of moisture are used in the application process. This in turn requires less severe (and thus cheaper) drying procedures which could reduce inoculum viability.

Method 3

A peat-cellulose sheet containing mycorrhizal propagules was prepared as follows. Dried peat-maize root inoculum, prepared as described above by culture of maize, was mixed with an equal proportion by dry weight of cotton linter fibres obtained by homogenizing Whatman No. 1 paper. The mycorrhizal fungus infecting the peat was Glomus mosseae YV strain. The suspended mixture was brought down on to a filter paper disc in a Buchner funnel. The resulting reconstituted layer of peat-containing paper was peeled from its backing sheet and allowed to dry. It had reasonable tensile strength and a weight of about 450 g/m$^2$. Using this laboratory method, paper of thickness as little as 1.5 mm was obtainable. Naturally, this could be improved using more sophisticated techniques of paper-making.

Method 4

Peat-wood pulp sheets were prepared as follows. Wood pulp, containig a small amount of urea-formaldehyde wet strength-imparting resin obtained by homogenizing Whatman 7 KG paper, was mixed with dried peat-maize root inoculum. The proportions used, by dry weight, were:

|   | Cellulose (Wood pulp) % | Peat-Maize root Inoculum % |
|---|---|---|
| (a) | 25 | 75 |
| (b) | 40 | 60 |
| (c) | 50 | 50 |
| (d) | 60 | 40 |

Paper sheets of three weights for each mixture were produced, these being 100, 150 and 300 g/m². All the papers except (a) were of reasonable tensile strength and the heavier, i.e. 150 and 300 g/m² papers, were more suitable. Obviously, sheets with higher proportions of cellulose than 60% can readily be made, but, of course, the aim is to incorporate as much inoculum as possible into each sheet.

4. Drying and storage

In most cases drying was carried out with paper sheets spread on a wire tray placed in a laminar flow bench with air at about 25°–30° C. passing over it. After air drying for various times (10–60 min) residual moisture levels were determined by taking sub-samples of paper and weighing before and after drying at 100° for 6-8 h. Moisture levels of between 5% and 38% have been achieved.

After drying to various moisture levels, the treated paper sheets were packed in polythene bags which were sealed and stored at 0°-4° C. Some undried sheets, to serve as controls, were also stored in polythene bags.

5. Infectivity tests

Bioassays using red or white clover have been used to assess infectivity of inoculum after the formulation and storage treatments. Several similar methods have been tried in the past but in the one currently used, gamma-irradiated (0.8 Megarad) soil, known to give suitable infection conditions for the endophyte under test, was mixed with the same volume of horticultural perlite or sand. Plastic tubes (9 cm high×2.5 cm diameter) with drainage holes were half filled with the mixture. Three replicate tubes were used per experiment. Single sub-sample discs of inoculum paper of the invention were placed in each tube and buried under about 2 cm of soil mixture. Four chitted red clover seed were sown per tube and lightly covered. The test plants were raised under standard conditions in a growth room at 22° C.

As roots developed they readily passed through the paper discs. The number of primary infection points per tube was scored after 28 days growth in three tubes per experiment and is recorded in Tables 1-6.

In a variation of this procedure, to which Table 7 relates, the tests were carried out in pots instead of tubes, 3 maize plants being raised in each pot and the growth medium being a mixture of gamma-irradiated soil and sand. The discs were buried at a depth of about 3 cm. The plants were raised in a glasshouse.

Mycorrhizal infection in test plants was found to be induced by these methods. The amount of infections was compared with that induced by the wet control sheets, to determine the effect of drying. Bare-root inoculum (YV) paper can be stored for at least three months in a dry condition and still retain some infectivity (Table 1). Infectivity declined during storage (Tables 1 and 2). Part of this residual infectivity could have been due primarily to the presence of a few resting spores accidentally mixed with the root inoculum. Where chopped roots associated with high levels of sporocarps and resting spores (YV strain) have been deliberately applied to the paper, the inoculum has retained a high level of infectivity for 28 weeks (Table 3).

Results shown in Tables 4 to 7 indicate that the presence of peat in the inoculum seems to enable propagules of the YV or E3 strain to retain viability for longer.

Taking all the results into consideration it appears that, under a storage temperature of 0°-4° C., high moisture content prolongs propagule viability as shown by values for 'controls (stored wet)'. However, in the presence of peat a significant proportion of propagules remain infective when stored for 3-6 months with moisture levels of 25-30%. At this level paper sheets are barely damp to the touch and are resistant to tearing. The strength of sheets with moisture levels of over about 40% is probably unacceptably low.

Alternative methods of drying and improvements to storage conditions may further extend the storage life of formulated mycorrhizal inoculum. However, with existing knowledge it is possible to keep unprocessed inoculum in cold storage for over 4 months and at least an additional 3 months after formulation into sheets and still retain acceptable levels of infectivity.

TABLE 1

Bare maize root (YV infected) stored wet for 23 weeks before formulation in reconstituted paper sheet (Whatman No. 1) (Method 1) and subsequent storage for 1-25 weeks.

| Length of storage after formulation | Mean No. primary infection points arising after 28 days: 1 wk | 6 wk | 12 wk | 25 wk |
|---|---|---|---|---|
| moisture in disc | | | | |
| 23% by wt. | 7.7 | 2.0 | 1.3 | — |
| 32% by wt. | 7.7 | 3.3 | 3.3 | 0.7 |
| control (stored wet) | 8.7 | 11.0 | 5.7 | 6.7 |

TABLE 2

Bare maize root (YV infected) stored wet for 5 weeks before formulation in a thin paper layer on pre-formed sheets (Whatman No. 1 and No. 91) (Method 2a) and subsequent storage for 2-28 weeks.

| Length of storage after formulation | Mean No. primary infection points after 28 days (mean of two types of paper): 2 wk | 4 wk | 10½ wk | 28 wk |
|---|---|---|---|---|
| moisture in disc | | | | |
| 10% by wt. | 4.3 | 2.2 | 1.5 | — |
| 21% by wt. | 6.5 | 2.3 | 2.3 | 0 |
| control (stored wet) | 9.3 | 10.2 | 8.5 | 5.0 |

TABLE 3

Bare root + sporocarps/individual resting spores of YV stored wet for 5 weeks before formulation (Whatman No. 1) (Method 2a) and subsequent storage for 4½-39 weeks.

| Length of storage after formulation | Mean No. primary infection points after 28 days: 4½ wks | 11 wks | 28 wks | 39 wks |
|---|---|---|---|---|
| moisture level in disc | | | | |
| 20% by wt. | 8.3 | 10.0 | 10.7 | 4.0 |
| control (stored wet) | 14.3 | 11.0 | 12.7 | 7.3 |

TABLE 4

Maize root (YV infected) in peat stored for 5 wks before formulation in a thin paper layer (Whatman No. 1) (Method 2a) and subsequent storage for 2-39 weeks.

| Length of storage after formulation | Mean No. primary infection points after 28 days | | | | |
|---|---|---|---|---|---|
| | 2 wks | 4½ wks | 11 wks | 28 wks | 39 wks |
| Moisture level in disc | | | | | |
| 28% by wt. | 13.0 | 8.7 | 7.7 | 7.0 | 5.7 |
| control (stored wet) | 15.7 | 11.7 | 10.7 | — | 8.3 |

TABLE 5

Milled lettuce root (YV infected) in peat supplied by Rothamsted, stored for several weeks before formulation (Whatman No. 1 and No. 6) (Method 2a) and subsequent storage for 2-32 weeks.

| Length of storage after formulation | Mean No. primary infection points after 28 days | | | |
|---|---|---|---|---|
| | 2 wks | 10 wks | 12 wks | 32 wks |
| Moisture level in disc | | | | |
| 24% by wt. | 8.2 | 5.2 | 4.0 | 4.0 |
| control (stored wet) | 7.2 | 9.7 | 3.8 | 4.0 |

TABLE 6

Maize root ("E3" infected) grown in peat or without peat (bare root) and stored wet for 18 weeks before formulation (Whatman No. 1) (Method 2b) and subsequent storage for 2-12 weeks.

| Length of storage after formulation | Mean No. primary infection points after 28 days | | |
|---|---|---|---|
| | 2 wks | 4 wks | 12 wks |
| Bare root 24% moisture | 9.3 | 8.0 | 2.7 |
| Bare root control (stored wet) | 12.7 | 11.7 | 9.3 |
| Root with peat 26% moisture | — | 8.7 | 6.3 |
| Root with peat control (stored wet) | — | 6.3 | 10.3 |

TABLE 7

Peat-cellulose fiber (Whatman No. 1) sheet containing peat-maize root (YV infected) inoculum (Method 3) stored for 5-66 weeks.

| Length of storage after fomulation | Mean No. primary infection points after 30 days | |
|---|---|---|
| | 5 wks | 66 wks |
| Moisture in disc | | |
| 12% by wt. | 13.3 | 0 |
| 27% by wt. | 19.7 | 5.3 |
| Control (stored wet) | 26.3 | 8.3 |
| Heat treated control (121°C., 15 min.) | 0 | 0 |

In further infectivity tests, maize root ("E3"-infected) was grown in peat, the peat-inoculum was stored for 4 weeks and then formulated into sheets containing 50% by dry weight of wood pulp, by Method 4. Sheets weighing 130-165 g/m were air dried to 25-27% moisture content and stored at room temperature for 4 weeks. These were placed beneath cucumber seedlings grown in irradiated soil, Phaseolus beans grown in peat compost under glass, and red clover seeds sown in a soil containing few native mycorrhizal propagules. After 6, 8 and 10 weeks 25% 45% and 80% respectively, of root lengths were infected by mycorrhizal fungus. Uninoculated control bean plants did not develop mycorrhizas, while uninoculated clover had only 5% of root length infected.

We claim:

1. The method of producing a mycorrhizal condition in a root system of the plant, which method comprises growing the plant and positioning across the path of growth of at least part of the root system, a root-penetrable, integral, self-supporting carrier material having thereon an adherent layer comprising inoculum of a mycorrhizal fungus, so that at least part of the root system of the plant grows into contact with the carrier material and thereby becomes infected.

2. A method according to claim 1, wherein the carrier material comprises a web-like structure.

3. A method according to claim 2, wherein an adhesive for bonding the inoculum layer to the web-like structure is provided as a separate layer between the inoculum layer and the web-like structure or as a component of the inoculum layer.

4. A method according to claim 2, wherein the adherent layer comprises said inoculum in a finely divided form cohered with the aid of a binder.

5. A method according to claim 2, wherein the web-like structure is a sheet comprising cellulosic fibres.

6. A method according to claim 5, wherein the fibres comprise cotton, wood pulp or paper fibres.

7. A method according to claim 5, wherein the sheet of cellulosic fibres is coated with a layer comprising cellulosic fibres and the inoculum.

8. A method according to claim 7, wherein the cellulosic fibres comprise cotton, wood pulp or paper fibres.

9. A method according to claim 8, wherein the inoculum layer comprises from 50 to 90% by dry weight of inoculum.

10. A method according to claim 2, wherein the inoculum is present in association with peat.

11. A method according to claim 1, wherein the inoculum is present in association with peat.

12. A method according to claim 1, wherein the mycorrhizal fungus is a vesicular-arbuscula mycorrhizal fungus.

13. A method according to claim 1, wherein the plant is grown in a container made of the carrier material having said inoculum layer adherent thereon.

14. A root-penetrable, integral, self-supporting carrier material having thereon an adherent layer comprising inoculum of a mycorrhizal fungus.

15. A carrier material according to claim 14 comprising a web-like structure having thereon said layer of the inoculum.

16. A carrier material according to claim 14, wherein the inoculum is present in association with peat.

* * * * *